United States Patent [19]

Villemin

[11] Patent Number: 4,903,371
[45] Date of Patent: Feb. 27, 1990

[54] PROCESS AND APPARATUS FOR THE TYING OF ARTICLES, ESPECIALLY MEAT-BASED PRODUCTS

[75] Inventor: Daniel Villemin, Ormesson, France

[73] Assignees: Boca-Quest; Unifrains-Union Financiere Pour Le Developpement De L'Economies Cerealiere, both of Cedex, France

[21] Appl. No.: 161,166

[22] Filed: Feb. 26, 1988

[30] Foreign Application Priority Data

Feb. 26, 1987 [FR] France .................... 87 02589

[51] Int. Cl.[4] ............................. B65B 63/04
[52] U.S. Cl. ...................... 17/1 R; 17/34; 100/5; 100/2
[58] Field of Search ............ 17/34, 33, 1 R, 45, 17/49; 100/1-3, 7, 10, 17, 18, 19 R, 31, 5; 426/641, 657

[56] References Cited

U.S. PATENT DOCUMENTS

| | | | |
|---|---|---|---|
| 3,019,722 | 2/1962 | Gum | 100/1 |
| 4,253,389 | 3/1981 | Campbell et al. | 100/5 |
| 4,394,987 | 7/1983 | Pedroia | 17/34 |
| 4,401,329 | 8/1983 | Pedroia | 17/34 |
| 4,516,387 | 5/1985 | Kupcikevicius | 17/33 |
| 4,541,660 | 9/1985 | Pujol | 17/34 |
| 4,578,933 | 4/1986 | Lang et al. | 53/589 |

FOREIGN PATENT DOCUMENTS

| | | |
|---|---|---|
| 0116351 | 8/1984 | European Pat. Off. . |
| 1539219 | 8/1968 | France . |
| 650162 | 2/1951 | United Kingdom . |

Primary Examiner—Willis Little
Attorney, Agent, or Firm—Fleit, Jacobson, Cohn, Price, Holman & Stern

[57] ABSTRACT

Typing process and apparatus, the articles (5) to be tied being placed on supports (6) subdivided in several planes and movable between several tying stations (3, 4), making it possible to carry out tyings in several planes on the articles (5) resting on the supports (6).

The invention is used especially for the tying of meat-based products, for example meat olives.

14 Claims, 6 Drawing Sheets

PROCESS AND APPARATUS FOR THE TYING OF ARTICLES, ESPECIALLY MEAT-BASED PRODUCTS

The present invention relates to a process and an apparatus for the tying of articles, especially articles of a type and/or consistency making them difficult to handle, this tying involving carrying out, round each article to be tied, at least two looping operations in parallel or intersecting planes by means of a tie and joining the ends of the tie together after at least one looping.

The tying of meat-based products, for example meat olives, roasting joints and loins, has hitherto usually been carried out manually, the ends of the twine being joined together by knotting after each looping or at the end of all the loopings.

For roasting joints and loins in particular, there has also already been a proposal to use prefabricated tubular nets made of elastic thread which are expanded to make it possible to introduce the roasting joints or loins and which, after being released, contract against the roasting joints or loins in order to hold them.

Manual tying with knotting involves considerable labour costs. Moreover, the tension under which the twine is knotted depends on the skill of the person responsible for tying, since this tension is exerted on the twine at the moment of knotting. Consumers are somewhat reluctant to accept elastic tubular nets, of which the placing on the roasting joints or loins can be automated, particularly because when the roasting joint or loin is being cut, the elastic threads, when severed, give way suddenly, thus presenting an appreciable risk of splashes. Furthermore, these tubular elastic nets are suitable only for relatively long products and not for less elongate products, such as meat olives, which require crossed tying.

Finally, the processes and devices known, for example, for the tying of parcels or other rigid articles cannot be used for articles of a type and/or consistency making them difficult to handle, especially meat-based food products, meat olives in particular.

The subject of the present invention is a tying process and apparatus allowing automatic tying without any manual involvement, even on non-rigid articles difficult to handle. The subject of the invention is also a tying process and apparatus allowing automatic uncrossed or crossed tying on elongate or non-elongate articles. Furthermore, the subject of the invention is a tying process and apparatus producing loops of twine of constant tension, even on articles of irregular consistency.

In the process according to the invention for the tying of articles, especially articles of a type and/or consistency making them difficult to handle, this tying involving carrying out, round each article to be tied, at least two looping operations in parallel or intersecting planes by means of a tie and joining the ends of the tie together after at least one looping, each article to be tied is placed on a movable support divided into several parts separated in the tying planes by passages for the looping tie, and the said support, together with the article resting on it, is shifted in order to bring the article successively into several tying positions in relation to at least one fixed tying station.

The use of a movable support designed both for the article to be tied and for the tying operations to be carried out on the article makes it possible to process easily articles difficult to handle because of their type and/or consistency, especially sticky, fatty, moist or soft articles, such as meat-based products.

Preferably, the support carrying the article to be tied is shifted successively between several fixed tying stations, and at least one tying is carried out on the article at each of these stations. A preferred use of the process according to the invention is the tying of food products, especially meat-based products, the article to be tied being surrounded by a sheet of involves material (meat olives) or not, this forming the outer casing of the product.

The apparatus according to the invention for the tying of articles, especially articles of a type and/or consistency making them difficult to handle, this tying involving carrying out, round each article to be tied, at least two looping operations in parallel or intersecting planes by means of a tie and joining the ends of the tie together after at least one looping, advantageously comprises at least one fixed tying station, at least one movable support for the article to be tied, this support being divided into several parts separated in planes corresponding to the planes in which the article is to be tied, and means for shifting the support relative to the tying station or tying stations successively into several positions allowing the tying operations to be carried out in the said planes on the article resting on the support.

Preferably, the support comprises a baseplate supporting the said parts at a distance above the baseplate by means of pillars or columns, so as to allow the looping tie to pass through, in the tying planes, between the baseplate and the article resting on the said parts, and the means for shifting the support act on the said baseplate.

According to a preferred embodiment, the apparatus comprises several tying stations and several supports and shifting means for transfering the said supports successively to the said tying stations.

The various supports are advantageously mounted on one and the same stepping-feed transport means, in order to cause the said supports successively to pass the various tying stations.

Each tying station, in order to carry out a looping of twine in a vertical plane about the article to be tied, advantageously comprises:

a twine guide movable horizontally to and fro between two positions located symmetrically on either side of the support, substantially in the looping plane, above the article resting on the support;

control means for causing the twine guide to pass from one position to the other at the start of each tying cycle;

a reserve of twine feeding the twine guide;

a twine-tensioning device between the reserve and the twine guide for ensuring that the twine drawn from the reserve is at a constant tension;

two opposing looping heads each movable simultaneously in opposition along arcuate paths between a high position, in which the head is on one side of the support above the article resting on the latter, near one of the two positions of the twine guide, and a low position, in which it is on the other side of the support below the article resting on the latter, and vice versa;

a twine gripper located on each looping head; and means for the alternating control of the grippers of the two heads.

According to an advantageous embodiment, thermoplastic-based twine is used for tying the articles and the ends of the twine are joined by welding after each looping. In this case, each tying station preferably comprises welding means movable to and fro in the tying plane of the said station, so that they can be brought up to and moved away from the article to be tied, and abutment means intended for the welding means and movable to and fro so that they can be engaged between the article to be tied and the welding means and removed from them in a direction substantially perpendicular to the said tying plane. Welding can be carried out by any suitable means, such as heating, the use of ultrasonics, etc. Although it is preferable to use a substantially non-extendable material for the twines, it may be appropriate in some cases to use an elastic material which ensures easier tightening of the product after looping.

Each tying station can also possess means for severing the twine by cutting or by fusion, these being associated with the said welding means so as to sever the twine between the weld and the reserve of twine.

Each tying station can also advantageously possess twine-locking means associated with the welding means and with the severing means and interacting with the abutment means to lock the ends of the twine between the welding location and the severing locations.

Preferably, the means for controlling the grippers of the two looping heads are designed so that, for each tying cycle, the gripper of the head which is near the twine guide before the start of the tying cycle is closed in order to grip the twine and remains closed until after welding and is opened before this head rises into the high position, and the gripper of the other head is opened during the descent of this head into the low position and is closed in order to grip the twine before welding and remains closed until after the welding taking place during the following tying cycle.

Preferably, the two looping heads with grippers are movable as a result of pivoting from the high position to the low position and vice versa in two parallel planes, and means are provided for shifting the two heads, in the low position, in opposition transversely relative to the said planes in one direction before welding, in order to intersect the two strands of the twine looping round the article and the abutment means, and in the opposite direction after welding.

Preferably, the welding means comprise a welding head surrounded by an annular pressure head for wedging the crossed ends of the looping twine against the abutment means during welding, the pressure head itself being surrounded by an annular head for fusion severing.

An illustrative and non-limiting embodiment of a tying apparatus according to the invention will be described in more detail below with reference to the accompanying drawing; in the drawing.

Figure 1:
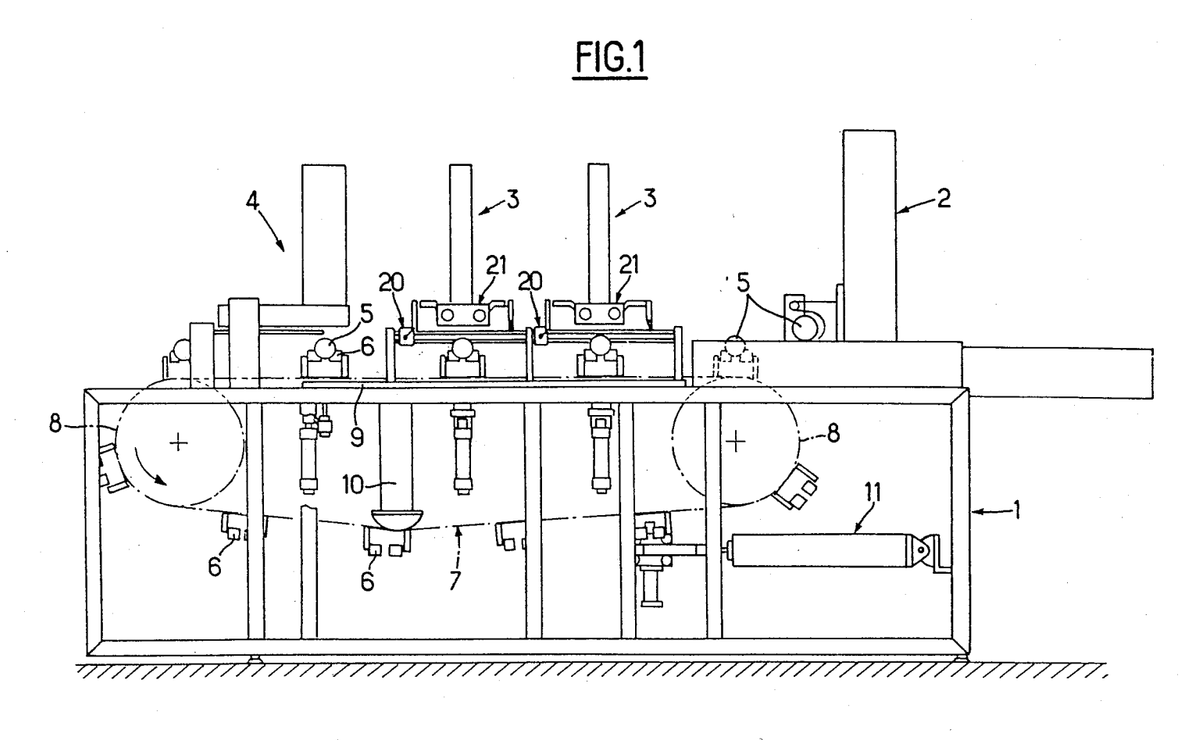
FIG. 1 is a general view of an apparatus for forming and tying meat olives with three tying stations.

According to FIG. 1, an apparatus for the forming and tying of meat olives comprises, on one and the same stand 1, a station 2 for shaping meat olives by rolling, as described in more detail in a patent application filed on the same day by the same applicants and entitled "Process and device for shaping soft and sticky products", two transverse tying stations 3 and a longitudinal tying station 4.

The meat olives 5 shaped at the station 2 are taken up one by one by supports 6 mounted on two parallel endless chains 7 passing over two double chain wheels 8. The upper strand of the chains 7 which is supported by a table 9 extends in a straight line between the two wheels 8 and 9 from the outlet of the shaping station 2 through the three tying stations 3 and 4, whilst the lower strand of the chains 7 is subjected to the action of a tensioner 10. The chains 7 are advanced in steps by means of a forward-feed control 11, for example with a pneumatic jack, the length of each step corresponding to the uniform distance between the supports 6.

Figures 2, 3, 4:
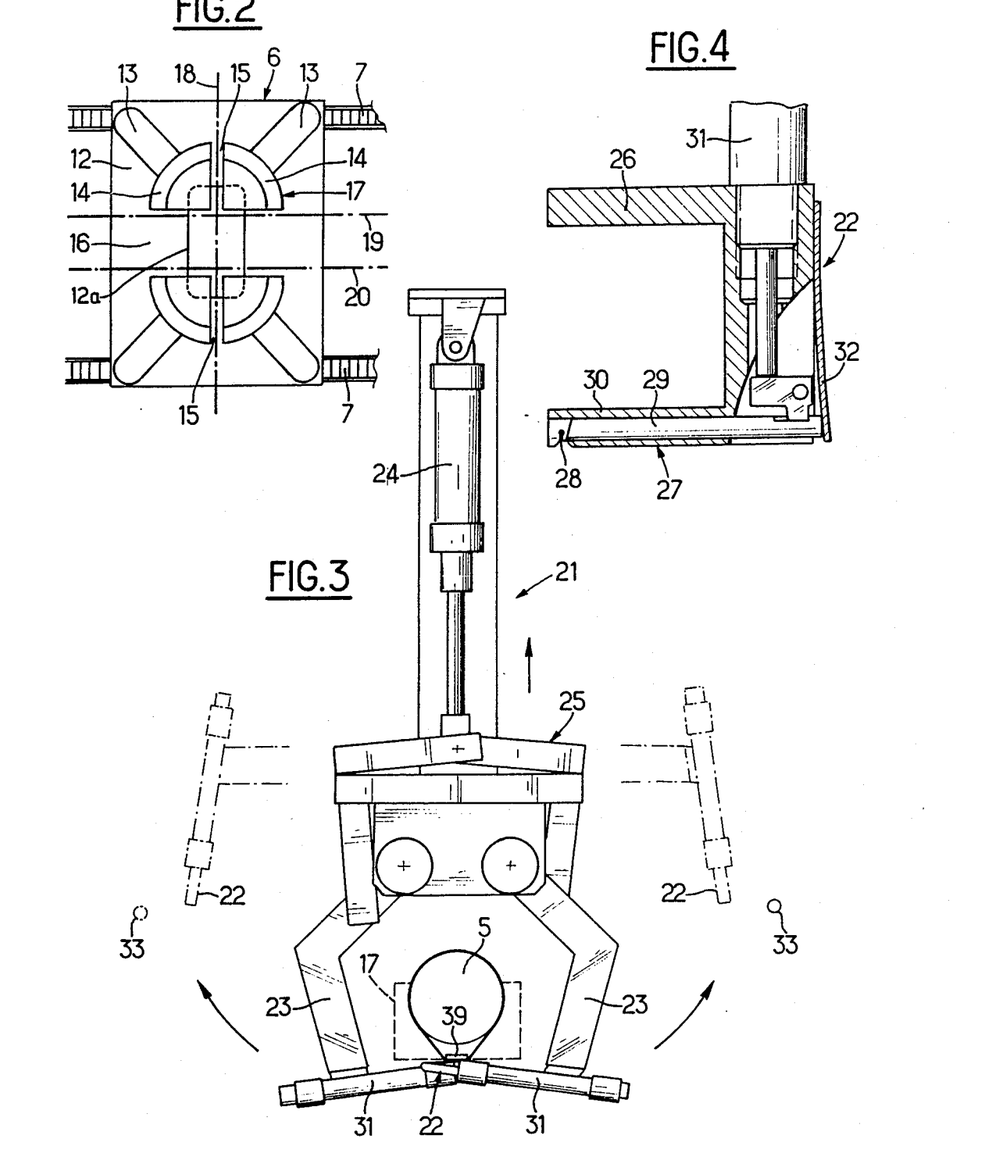
FIG. 2 is a plan view of one of the meatolive supports used in the apparatus of FIG. 1.
FIG. 3 is a view of the looping means of a tying station.
FIG. 4 shows a looping head and its gripper in section and on a larger scale.
Figure 7:
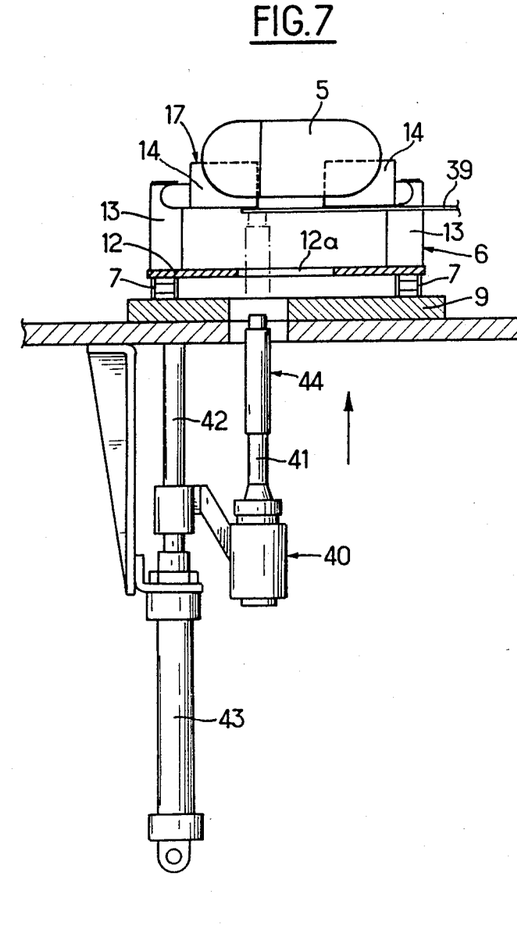
FIG. 7 shows the welding and severing means and the abutment means of a tying station.

As shown in FIGS. 2 and 7, each support 6 comprises a plate 12 fastened to the two chains 7. The plate 12, which is provided with a central orifice 12a, the function of which will emerge later, supports by means of four pillars 13 four identical mould parts 14, each forming a quarter of a mould. The four mould parts 14 are separated by a gap 15 of small width in a vertical plane perpendicular to the chains 7 and by a gap 16 of greater width in a vertical plane parallel to the chains 7. The four mould parts 14 thus complete one another in the form of a mould 17, the shape of which is matched to the shape of the meat olive to be received.

The gap 15 is intended to allow one tying, in particular a longitudinal tying of the meat olive in a vertical plane 18, whilst the gap 16 of greater width is intended to allow two transverse tyings of the meat olive in two vertical planes 19, 20.

According to FIGS. 3 to 6, each tying station comprises a twine-positioning device 20 (FIGS. 5 and 6) and a looping device 21 (FIGS. 3 and 4), one interacting with the other.

The looping device 21 comprises two looping heads 22 mounted on two oscillating arms 23 controlled by a common jack 24 via a connecting-rod system 25, in such a way that the two heads 22 can be brought along paths in the form an arc of a circle from a high position represented by dot-and-dash lines in FIG. 3, in which the two heads 22 are located above the meat olive 5 contained in the mould 17, on either side of the meat olive, into a low position, in which the two heads 22 have passed underneath the mould 17 between the latter and the support plate 12, intersecting their movements, that is to say the head 22 on the left in the high position is on the right in the low position, and vice versa.

Each head 22 comprises a guide branch 26 and a branch forming a gripper 27. The gripper consists of a notch 28 made in a sleeve 30. A rod 29 mounted slidably in the sleeve 30 is movable in a translational movement in one direction under the action of a jack 31 and in the opposite direction under the action of a spring 32, in order to wedge a twine engaged in the notch 28 of the sleeve 30.

Figure 6:
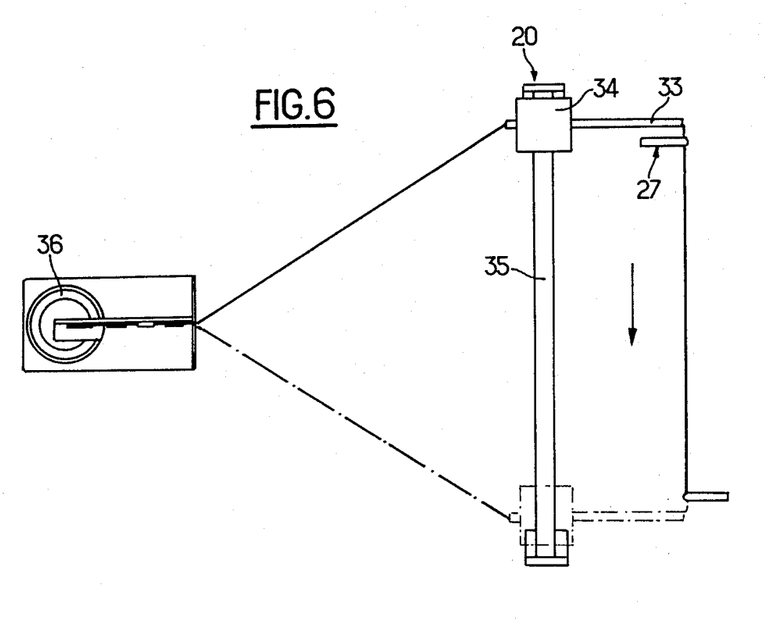
FIG. 6 is a plan view of the whole of FIG. 5.

As emerges particularly from FIG. 6, the two grippers 27 project in opposite directions on the two heads 22 which are arranged and, during the pivoting of the arms 23, move, in the same way as these, in two parallel planes.

Means (not shown), for example pneumatic jacks, are provided to shift the two arms 23 transversely relative to their pivoting planes for a purpose which will emerge later.

The twine-positioning device 20 (FIGS. 5 and 6) comprises a twine guide 33 consisting of a horizontal tube fastened to a slide 34 movable to and fro under the action of a double-acting pneumatic jack (not shown) on two horizontal guide rods 35 extending parallel to the plane of the tying to be carried out. The twine-guide tube 33 is fed with twine from a reel 36 by means of a preferably adjustable tensioner 37 and a slack-compensating system 38.

Figure 5:
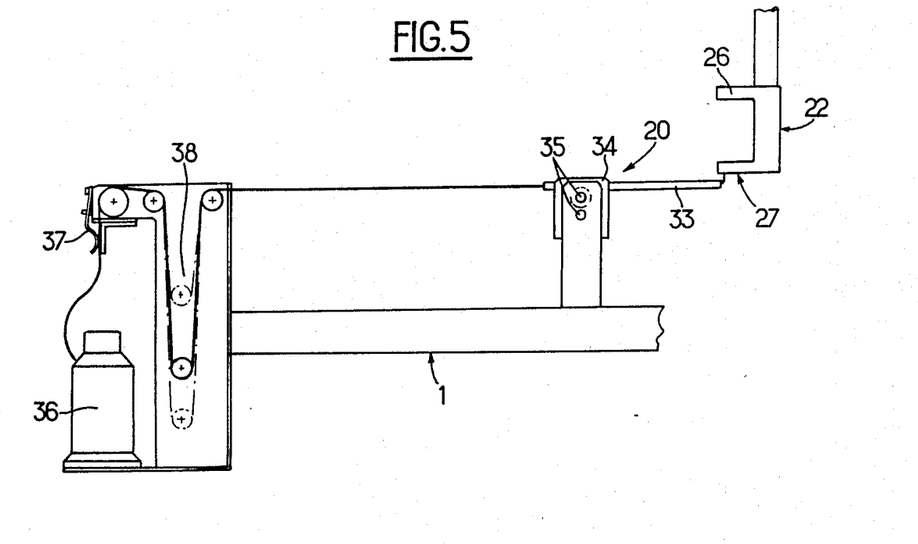
FIG. 5 is an elevation view of a twine guide and its twine feed.

In the two end positions of the twine-guide tube 33, the latter is slightly on the outside of and below the heads 22 in the high position (see FIGS. 3, 5 and 6).

According to FIGS. 3, 7 and 8, each tying station 3, 4 also possesses an abutment blade 39 movable under the action of a control (not shown), for example a double-acting pneumatic jack, below the mould 17, as near as possible to the meat olive 5 contained in the mould, between a retracted position, in which the blade 39 is completely removed from the path of the supports 6, and an engagement position (FIG. 7), in which the blade 39 is engaged below the mould 17, which is in the tying position, beyond the plane in which tying is to be carried out at this station. The blade 39 serves as an abutment for a welding head described below.

It is appropriate to note that, on the two transverse tying stations 3, the abutment blades 39 movable in the longitudinal direction of the meat olives 5, that is to say transversely relative to the chains 7, execute a straight to-and-fro movement perpendicular to the drawing plane. In contrast, at the longitudinal tying station 4, the blade 39 has to be engaged and retracted as a result of a pivoting movement about a vertical axis, so that it can be retracted from the path of the moulds 17. The blade 39 also executes a slight rising movement at the end of its engagement movement and a slight descending movement at the start of its retraction movement.

Figure 8:
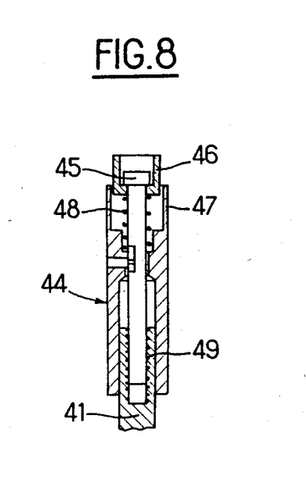
FIG. 8 is a section on a larger scale through the upper part of the welding and severing means.

Each tying station 3, 4 also possesses a welding and severing device 40 illustrated by FIGS. 7 and 8. This device 40 comprises a support 41 movable vertically to and fro on two guide rods 42 under the action of a double-acting pneumatic jack 43.

The support 41 carries a welding, pressure and severing unit 44 which, according to FIG. 8, comprises a central welding head 45 surrounded by an annular pressure head 46, itself surrounded by an annular severing head 47. The welding head 45 takes the form of a vertical rod, the lower end of which is mounted vertically slidably in the support 41 and the free upper end of which is shaped into a portion of increased diameter forming the actual welding head. The severing head 47 takes the form of a collar surrounding the welding head 45 and fastened to the upper end of the support 41. The pressure head 46 consists of a piece in the form of a cup with a perforated bottom, this cup being mounted slidably on the rod of the welding head 45 and being stressed upwards against the end portion of the welding head 45 by means of a compression spring 48 inserted between the severing head 47 and the lower face of the pressure head 46.

The outside diameter of the severing head 47 is greater than this dimension of the abutment blade 39.

The two welding 45 and severing 47 heads are heated electrically by means of a common heating resistor 49, with the temperature of the welding head 45 being regulated by a thermocouple. By the use of materials having different thermal conductivities for the two heads 45 and 47 and by the choice of the shape of these two heads, it is possible to ensure that, when the welding head 45 has an ideal temperature for welding, the severing head has a higher temperature which allows fusion severing. It will be appreciated, of course, that the twine could also be severed by other means, for example by cutting.

As shown in FIG. 8, when the welding unit 44 is at rest, the upper edge of the pressure head 46 is above the upper edge of the welding head 45, itself located above the upper edge of the severing head 47.

When the welding unit 44, under the action of the jack 43, is laid from below, via the orifice 12a in the plate 12, against the abutment blade 39 engaged below the meat olive 5 to be tied which rests in the mould 17, the pressure head 46 first comes up against the blade 39, so that the spring 48 is compressed before the welding head 45 likewise comes up against the blade 39. In this position, the severing head 47 is at a very short distance underneath the blade 39 (see FIG. 14).

The Figures show the welding unit 44 arranged below the supports 6. However, such an arrangement, although advantageous in some cases, can have disadvantages, especially if fragments of products fall onto the welding head, thus risking impairing its operation. It is therefore also possible to arrange the welding unit in an upper position above the supports 6. The position of possible abutment blades 39 required is then likewise reversed.

Referring to FIGS. 9 to 16, a complete tying cycle at any one of the tying stations 3, 4 will be described below.

Figure 9:
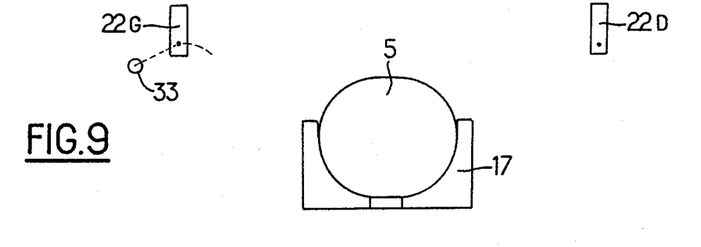
FIGS. 9 to 16 show diagrammatically the various phases of a cycle for the tying of a meat olive.

The tying cycle starts when a meat olive 5 contained in its mould 17 has been delivered to one of the tying stations. The two looping heads 22 (designated by 22 G for the left-hand head and by 22 D for the right-hand head) are in the high position. The twine-guide tube 33 is, for example, in the left-hand position near the left-hand guide head 22 G, and the free end of the twine emerging from this tube is gripped in the gripper of the left-hand head 22 G (FIG. 9).

Figure 10:
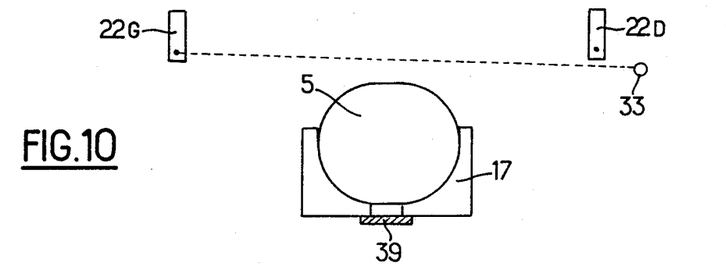

The twine-guide tube 33 is shifted from left to right beyond and below the right-hand head 22 D, so that a corresponding length of twine drawn off from the reel 36 is stretched above the meat olive 5 between the gripper of the left-hand head 22 G and the tube 33 (FIG. 10).

At the same time, following this shift of the tube 33, the abutment blade 39 is advanced from the retracted position to the engagement position below the mould 17.

In the following phase, the two looping heads 22 G and 22 D are brought into the low position oppositely to one another, so that the left-hand gripper 22 G is on the right and the right-hand gripper 22 D is on the left below the mould 17. During this lowering movement, the two heads 22 G and 22 D wind the twine round the meat olive and the abutment blade 39, the head 22 G because the free end of the twine is gripped in this head and the head 22 D, without gripping the twine, simply because the twine is in the path of the head 22 D (FIG. 11).

Figure 11:
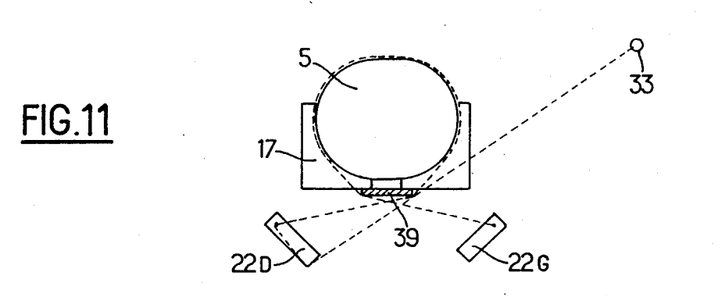
Figure 12:
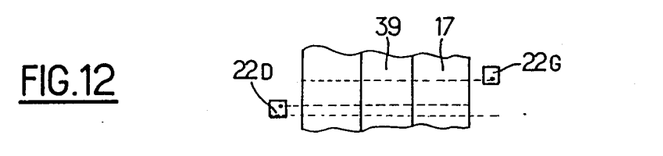

FIG. 12, which is a bottom view of FIG. 11, shows that the two lower strands of the twine are in two parallel planes, because the two heads 22 G and 22 D move in two parallel planes during their descent. Consequently, the two strands of the twine are arranged side by side underneath the abutment blade 39.

When the two heads 22 D and 22 G have reached the low position, the gripper 22 D is closed, so that the twine is then wedged in the two heads 22 G and 22 D.

Figure 13:
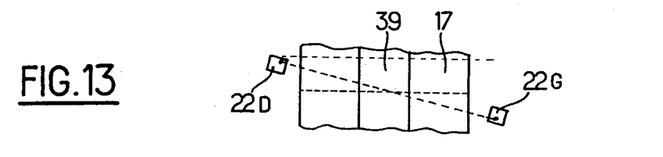

The two grippers 22 G and 22 D are subsequently moved in opposition transversely relative to their pivoting planes, so as to intersect below the abutment blade 39 the two strands of twine gripped by the two heads 22 G and 22 D (FIG. 13).

Figure 14:
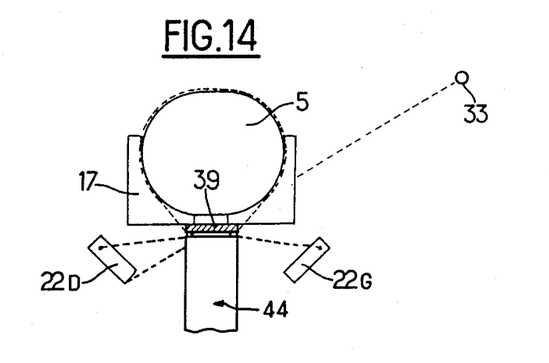

During the following phase, the welding unit 44 is laid against the lower face of the abutment blade 39 at the point of intersection of the strands of twine. The pressure head 46 comes up first against the blade 39 in order to lock the two strands of twine against the blade 39. Subsequently, the heated welding head 45 comes up against the crossed strands of the twine in order to weld them to one another. Finally, the likewise heated severing head 47 comes in contact with the two twine strands gripped between the guide heads 22 G and 22 D and the pressure head 46 and severs them by fusion on either side of the blade 39 (FIG. 14).

Figure 15:
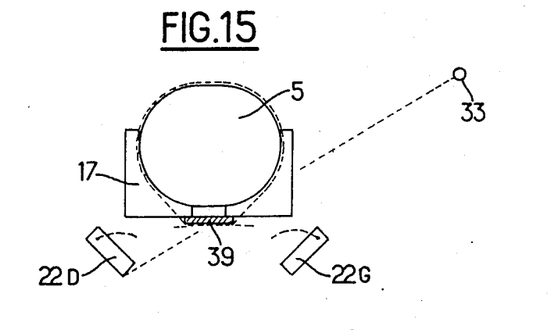

Thus, when the welding unit 44 is retracted from the abutment blade 39, the meat olive 5 and the blade 39 are surrounded by a loop of twine closed by welding, which is separated from the twine coming from the twine-guide tube 33 and the end of which remains gripped by the head 22 D (FIG. 15).

Figure 16:
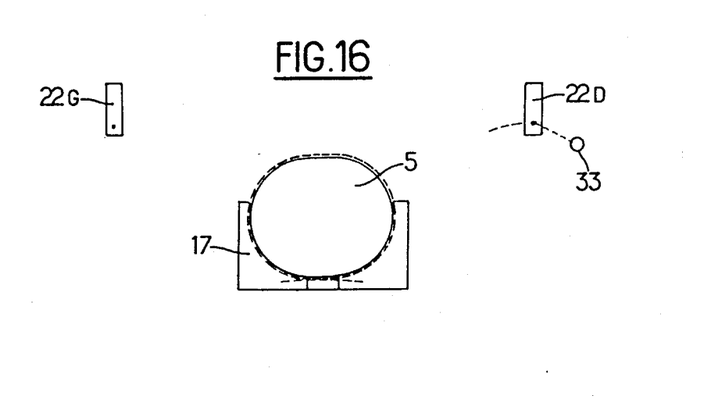

The abutment blade 39 is then retracted, so that the loop of twine now surrounds only the meat olive 5, the gripper of the left-hand head 22 G is opened to release the twine end still gripped in it, but keeping the gripper of the right-hand head 22 D closed, and the two heads 22 G and 22 D are returned in the opposite direction in their pivoting planes and raised into the high position as a result of pivoting (FIG. 16). The slack caused in the twine by the rising movement of the head 22 D gripping the end of the twine into the vicinity of the twine-guide tube 33 occupying the right-hand position is absorbed by the device 38 (FIG. 5).

After the tied meat olive 5 contained in its mould 17 has been removed from the tying station and another mould carrying a new meat olive to be tied has been put in position at the same tying station, this tying station is ready for a new tying cycle which differs from the cycle described only in that, at the start of the cycle, the twine is brought above the meat olive from right to left by the tube 33 and remains gripped in the right-hand head 22 D until after welding, subsequently being taken up by the left-hand gripper 22 G.

It is appropriate to note that the embodiment illustrated by the drawing and described above has been given only by way of example and that many modifications and variants are possible within the scope of the invention.

Thus, the invention can be used for the tying of food products other than meat olives, for example roasting joints or loins which may require only transverse tyings. Of course, in this case, the support of the product to be tied of suitable shape has only transverse slits to allow these tyings.

Furthermore, the invention can also be used for articles other than food products, its advantages being especially useful when the article to be tied are of a type and/or consistency making them difficult or tricky to handle.

Where the tying of food products in particular is concerned, it is advantageous if the supports 6 (moulds 17) are fastened to the transport means (chains 7 or equivalent means) in an easily removable way.

The use of thermoplastic twine is especially advantageous for food products which are to undergo cooking and/or roasting in the tied state, as with meat olives or roasting joints. In fact, to remove the twine after cooking or roasting, it is sufficent to exert force on the welds of the twine which then give way without the need to cut the twine.

In this case, the twine can preferably consist of a cotton core surrounded by a thermoplastic sheath, for example food-quality polyethylene.

However, instead of the ends of the looping twine being joined by welding, it is also possible to join them by knotting, for example using knotting mechanisms mounted in place of the welding units 44.

I claim:

1. Apparatus for the tying of articles, especially articles of a type and/or consistency making them difficult to handle, this tying involving carrying out, round each article to be tied, at least two looping operations in parallel or intersecting planes by means of a tie and joining the ends of the tie together after at least one looping, comprising at least one fixed tying station, at least one movable support for the article to be tied, this support being divided into several parts separated in planes corresponding to the planes in which the article is to be tied, and means for shifting the support relative to the tying station or tying stations successively into several positions allowing the tying operations to be carried out in the said planes on the article resting on the support.

2. Apparatus according to claim 1, wherein the support comprises a baseplate supporting the said parts at a distance above the baseplate by means of pillars or columns, so as to allow the looping tie to pass through, in the tying planes, between the baseplate and the article resting on the said parts, and in that the means for shifting the support act on the said baseplate.

3. Apparatus according to claim 1, comprising several tying stations and several supports and shifting means for transferring the said supports successively to the said tying stations.

4. Apparatus according to claim 3, wherein the various supports are mounted on one and the same stepping-feed transport means in order to cause the said supports successively to pass the various tying stations.

5. Apparatus according to claim 1, wherein each tying station, in order to carry out a looping of twine in a vertical plane about the article to be tied, comprises:

a twine guide movable horizontally to and fro between two positions located symmetrically on either side of the support, substantially in the looping plane, above the article resting on the support;

control means for causing the twine guide to pass from one position to the other at the start of each tying cycle;

a reserve of twine feeding the twine guide;

a twine-tensioning device between the reserve and the twine guide for ensuring that the twine drawn off from the reserve has a constant tension;

two opposing looping heads each movable simultaneously in opposition along arcuate paths between a high position, in which the head is located on one side of the support above the article resting on the latter, near one of the two positions of the twine guide, and a low position, in which it is on the other side of the support below the article resting on the latter, and vice versa;

a twine gripper arranged on each looping head; and means for the alternating control of the grippers of the two heads.

6. Apparatus according to claim 3, wherein each tying station comprises welding means movable to and fro in the tying plane of the said station, so that they can be brought up to and moved away from the article to be tied, and abutment means intended for the welding means and movable to and fro so that they can be engaged between the article to be tied and the welding means and be removed from them in a direction substantially perpendicular to the said tying plane.

7. Apparatus according to claim 6, wherein each tying station also possesses means for severing the twine which are arranged so as to sever the twine between the weld and the reserve of twine.

8. Apparatus according to claim 7, wherein the severing means act by the fusion of the twine and are associated with the welding means.

9. Apparatus according to claim 7, wherein each tying station also possesses means for locking the twine, associated with the welding means and with the severing means and interacting with the abutment means in order to lock the ends of the twine between the welding location and the severing locations.

10. Apparatus according to claim 5 wherein the said means for controlling the grippers of the two looping heads are designed so that, for each tying cycle, the gripper of the head, which, is near the twine guide before the start of the tying cycle is closed in order to grip the twine and remains closed until after welding and is opened before this head rises into the high position, and the gripper of the other head is opened during the descent of this head into the low position and is closed in order to grip the twine before welding and remains closed until after the welding taking place during the following tying cycle.

11. Apparatus according to claim 6 wherein the two looping heads are movable as a result of pivoting from the high position to the low position, and vice versa, in two parallel planes, and in that means are provided for shifting the two heads into the low position in opposition transversely relative to the said planes in one direction before welding, in order to intersect the two strands of the twine looping round the article and the abutment means, and in the opposite direction after welding.

12. Apparatus according to claim 6 wherein the welding means comprise a welding head surrounded by an annular pressure head, in order to wedge the crossed ends of the twine against the abutment means, the pressure head itself being surrounded by an annular head for fusion severing.

13. A method of tying articles, especially articles of a type and consistency making them difficult to handle, comprising the steps of:

placing each article to be tied at a charging station on a support divided into several parts separated from one another in at least two planes perpendicular or parallel to each other, shifting said support with said article resting on it successively into fixed several fixed tying stations, and carrying out at each of said tying stations at least one looping operation on said article resting on said support by passing a loop of strand in each of said planes around said article, and joining the ends of each strand loop after each looping in one of said planes.

14. The method of claim 13 applied for tying food products, especially meat-based products, wherein the article to be tied is surrounded by a sheet of edible material which forms the outer casing of the product.

* * * * *